United States Patent [19]

Rohwer

[11] Patent Number: 5,780,288
[45] Date of Patent: *Jul. 14, 1998

[54] PROCESS TO DESTROY BIOLOGICAL ACTIVITY IN PROTEIN-CONTAINING FEED

[76] Inventor: Gary L. Rohwer, 29575 Bar Diamond La., Parma, Id. 83660

[*] Notice: The term of this patent shall not extend beyond the expiration date of Pat. No. 5,514,388.

[21] Appl. No.: 643,840

[22] Filed: May 7, 1996

Related U.S. Application Data

[63] Continuation-in-part of Ser. No. 299,822, Aug. 31, 1994, Pat. No. 5,514,388.

[51] Int. Cl.$^6$ .................................................. C12N 7/06
[52] U.S. Cl. .................. 435/238; 426/231; 426/573; 426/601; 426/635; 426/98; 426/2; 530/350; 424/451
[58] Field of Search ..................... 426/231, 573, 426/601, 635, 98, 2; 530/350; 435/238; 424/451

[56] References Cited

U.S. PATENT DOCUMENTS 5,514,388  5/1996  Rohwer .................................. 426/231

OTHER PUBLICATIONS

Prusiner, PNAs, vol. 90(1), pp. 1–5, 1993.

*Primary Examiner*—Chhaya D. Sayala
*Attorney, Agent, or Firm*—Margaret M. Dunbar

[57] ABSTRACT

A product and process for animal feed ingredients free of biologically active proteins as well as bacteria and viruses. The process comprises the steps of: treating a proteinaceous mixture with alkali to cause the pH of the mixture to be raised to where proteins in the proteinaceous mixture will be solubilized to form a gel; maintaining the proteinaceous mixture at a temperature in a range between about 50° to 55° C.; adding if needed, sufficient lipid material, to the alkali-treated proteinaceous mixture to provide a dispersion with a ratio of lipid to proteinaceous mixture in a range from about 5 to 80, respectively; determining an optimum pH of solubilization expressed as an alkali hydrogen ion difference on a hydrogen ion difference curve, measuring rate of change of hydrogen ion difference per unit of acid equivalent, ceasing addition of alkali when the slope of the titration curve is essentially zero, adding an acid to the lipid material/proteinaceous mixture dispersion to cause the pH of the dispersion to be lowered to an acidic endpoint where the proteins encapsulate the lipid material; the acidic endpoint being defined by: i) determining a pH of encapsulation by titration, expressed as an acidic hydrogen ion difference on a hydrogen ion difference curve, ii) measuring rate of change of hydrogen ion difference per unit of acid equivalent, iii) ceasing addition of acid when the slope of the titration curve is essentially zero.

4 Claims, 2 Drawing Sheets

PROCESS TO DESTROY BIOLOGICAL ACTIVITY IN PROTEIN-CONTAINING FEED

This application is a continuation-in-part of application Ser. No. 08/299,822, filed Aug. 31, 1994, Now U.S. Pat. Ser. No. 5,514,388.

BACKGROUND OF THE INVENTION

1. Technical Field

This invention relates to an encapsulated lipid animal feed which is free of biologically active proteins as well as infectious vectors and the process for producing such feed in a commercially viable manner.

2. Background

Creutzfeldt-Jakob Disease (CJD) is a rare neurological disease found in humans, first described in the 1920s and found worldwide. It is usually manifested in late middle-age with progressive dementia and is usually fatal within six months. It is characterized by spongiform changes in the brain, but this can only readily be diagnosed at post mortem. The identification in 1996 of at least 10 cases of CJD in Britain which seem to represent a new variant caused concern that these cases could be linked to exposure to bovine spongiform encephalopathy (BSE), or "Mad Cow Syndrome," which has infected some 160,000 cows in Britain. The distinct variant in these 10 cases occurred in people aged under 42 with dates of onset of illness in the last two years. This variant has not been previously recognized and is characterized by behavioral change, ataxia, progressive cognitive impairment and a tendency to a prolonged duration of illness. In April 1996, Dr. Stanley B. Prusiner of the University of California, San Francisco, presented scientific evidence that he believes indicates a link between CJD and BSE.

In 1988, as a result of earlier concerns about the possible transmission of BSE to humans, the UK adopted control measures which included: 1) destroying cattle clinically diagnosed on the farm, 2) prohibiting feeding cattle and other ruminants material containing animal protein derived from ruminants and 3) destroying carcasses of cattle infected with BSE. The public health threat of the 10 new cases was deemed great enough that the European Union (EU) has imposed further precautionary measures which include: 1) a ban on the international sale of all meat, offal, semen, embryos, and other products of British cattle, 2) a requirement that carcasses from cattle aged over 30 months must be destroyed, and 3) a prohibition on the use of mammalian meat and bone meal in feed for all farm animals.

The health panic triggered by the evidence that the fatal CJD might be caused by eating beef has fast become a significant economic issue. The cost to the UK and EU alone of destroying cattle which are aged over 30 months is predicted to be approximately $10 billion if the cattle are killed at a rate of 15,000 per week over the next six years.

There have been no reported cases of BSE in the United States; nonetheless, as a preventative measure, a prohibition of imported ruminants from the U.K. was implemented in July 1989. Scrapie and other forms of spongiform encephalopathy are present in the United States, however, causing an intense interest in BSE. Presently, a voluntary practice against feeding ruminant byproducts to ruminants exists in the U.S. There is ongoing discussion among governmental regulatory agencies on whether to impose an official ban on such feeding practices. A related issue of concern in the U.S. is that a transmissible form of spongiform encephalopathy found in ranched mink, Transmissible Mink Encephalopathy (TME), has been primarily attributed to feeding the mink-scrapie-infected sheep and goat carcasses. Cattle carcasses, which are also part of the ranched mink diet, are now a suspected source of TME (Bolis & Gibbs J. Amer. Vet. Med. Assoc., 1990).

BSE is believed to be caused by a biological agent called a prion protein. Prions are unique to the world of biology because they are able to replicate without the benefit of any nucleic acid (e.g., DNA or RNA). Nucleic acids are used by everything from viruses to bacteria to humans to store genetic information. This genetic information is used by organisms to build specific proteins. Proteins, in turn, do the work of the cell. Normally, proteins do not have the ability to vary genetic information. What makes prions very unusual is that they seem to be made exclusively of proteins. Since prions are able to propagate themselves, it is believed that the prion proteins are able to carry genetic information. The unusual ability of prions to possibly carry genetic information in their proteins probably explains the unique etiology of BSE and other diseases caused by prions.

BSE and other species forms of scrapies are caused by a change in secondary structure of a normal prion, as shown in FIG. 1A, designated as PrPc protein. It is thought the change is induced when the abnormal form of the prion, as shown in FIG. 1B, designated as PrPsc, is consumed and absorbed by the animal. The potential spread of other abnormal prions, viruses and bacteria requires a way to recover protein and fat for use in feeds and foods which destroys all biological activity yet leaves the material digestible. Improper operation of current rendering methods is suspected to be the cause of the spread of the disease-producing PrPsc form of the prion from the tissue of BSE-infected people in Europe who consumed British meat products carrying the disease-causing form of the prion. The PrPsc-prion-caused disorders have been found in humans, mice, cats, elk, deer and zoo animals besides cattle and sheep.

The best test available for the biological activity of the PrPsc (scrapies-causing form) prion protein responsible for the disorder constitutes transferring the scrapies disease to healthy Syrian hamsters by intracerebral inoculation of crude brain extracts derived from individuals suffering from the disease (Prusiner, 1982, Ann Neuro). The animals thus injected start producing abnormal prion.

The actual sequence of events which allows the abnormal form of the prion (PrPsc) to induce the change in normal prions (PrPc) to the abnormal forms (PrPsc) is not completely clear. It is known that the secondary structure of the PrPc prion is an alpha helix and the disease-producing PrPsc prion has approximately 50% beta pleated sheet in its secondary structure.

All proteins, including prions, are made of varying combinations of alpha amino acids linked with peptide bonds. This linking of amino acids into poly-peptide chains forms the primary structure, or "back bone" of the protein. The order, composition and folded structure of the amino acids makes proteins unique. Each of the 20 amino acids used in building all proteins are common in how they link together to form proteins. Each amino acid is different because of the composition of its residue. The residues of the 20 amino acids are either polar (hydrophilic) or non-polar (hydrophobic). The hydrophobic residues will characteristically orient toward lipids (fats and oils). They hydrophilic residues will characteristically orient towards water. Over 54% of the amino acid residues of the BSE prion are hydrophobic.

The folded structure of the protein is determined by the amino acid order of the peptide chain, bonding between residues, attraction or repulsion between residues, controls by the cellular machinery and the chemical environment. The right folding gives the protein a unique structure and its biological activity. The folded structure is referred to as the protein's secondary and tertiary structure, with the amino acid sequence representing the primary structure of the protein.

A secondary structure where the backbone is formed in a gentle spiral is an alpha helix. A secondary structure where backbones of the protein are held side by side is a beta pleated sheet. The PrPc prion is an alpha helix form of the protein and is normal. The same prion protein in the PrPsc form is half pleated sheet and half alpha helix and causes spongiform disorders such as BSE. The infectivity of the PrPsc prion can be diminished by conditions such as urea, detergents and high pH known to denature proteins (Prusiner, 1993, Proc. Natl Acad Sci USA). Denature means destroying biological activity by disrupting or changing the secondary and tertiary structure between the residues of the amino acids.

Conventional rendering depends on crude grinding and heating to separate lipids from proteins and to denature proteins. Because current rendering does not ensure the exposure of the individual proteins during the process, or if heating is inadequate, it is possible for prions, genetic material and viruses to escape current rendering processes with biological activity. This may be what happened with BSE in Britain.

Detectable infectivity of BSE was found in 4 of 15 rendering systems producing meat and bone meal from possible BSE cattle carcasses (Taylor et al Vet. Record, 1995). Use of high urea or chaotropic salts or detergents diminished the infectious form of hamster prion to very low levels (Prusiner et al Proc. Natl. Acad. Sci.USA 1993). In other studies BSE infected bovine brains were rendered by treating with high levels of sodium hypochlorite, dichloroisocyanurate or hydroxide, and none of these treatments produced complete inactivation of the infectious form of the prion (Taylor et al Arch. Virl, 1994).

Treatment of rendered animal material with urea, chaotropic salts, detergents, hypochlorite, dichloroisocyanurate, or hydroxide will produce unusable feed ingredients and in commercial practice would be ineffective at controlling the spread of infectious prions.

What is still needed is a process for producing feeds and feed ingredients by which all biological activity is destroyed in any type of material containing protein and lipid without destroying the primary structure of the protein.

DISCLOSURE OF INVENTION

It is an object of this invention to provide a process by which all biological activity is destroyed in any type of material containing protein and lipid without destroying the primary structure of the protein.

According to the invention, a process for producing nutrient compositions derived from a proteinaceous mixture is provided which ensures that all proteins and genetic material are completely denatured and all biological activity is lost without destroying the primary structure of the protein. The process generally comprises the steps of:

a) treating the proteinaceous mixture by adding an alkali to cause the pH of the mixture to be raised to a basic pH range where proteins in the proteinaceous mixture will be solubilized to form a gel; maintaining the proteinaceous mixture at a temperature above the melting point of a lipid material, in a range between about 50° to 55° C.; adding if needed, sufficient lipid material, to the alkali-treated proteinaceous mixture to provide a dispersion with a ratio of lipid to proteinaceous mixture in a range from about 5 to 80, respectively;

b) determining an optimum pH of solubilization wherein that optimum is expressed as an alkali hydrogen ion difference on a hydrogen ion difference curve, c) measuring rate of change of hydrogen ion difference per unit of acid equivalent, d) ceasing addition of alkali when the slope of the titration curve is essentially zero, e) adding an acid to the lipid material/proteinaceous mixture dispersion to cause the pH of the dispersion to be lowered to an acidic endpoint where the proteins in the dispersion will encapsulate the lipid material; the acidic endpoint being defined by i) determining a pH of encapsulation by titration wherein that pH of encapsulation is expressed as an acidic hydrogen ion difference on a hydrogen ion difference curve, ii) measuring rate of change of hydrogen ion difference per unit of acid equivalent, iii) ceasing addition of acid when the slope of the titration curve is essentially zero.

Additional advantages and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

DETAILED DESCRIPTION OF THE INVENTION

Figure 1A:
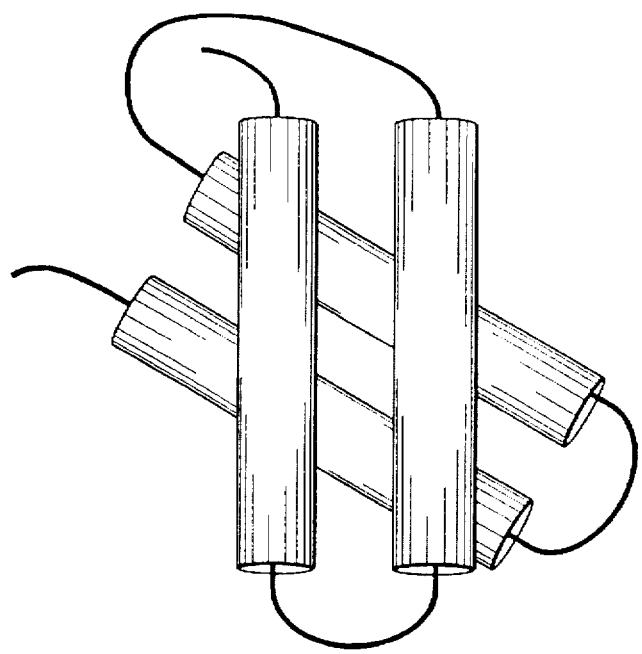
FIG. 1A is schematic of the secondary structure of a prion protein in the normal, alpha-helix form.
Figure 1B:
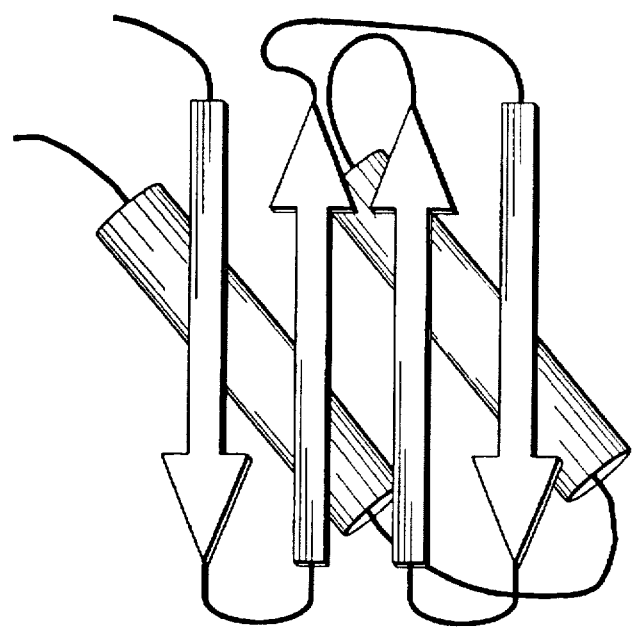
FIG. 1B is a schematic of the secondary structure of a prion protein in the abnormal, alpha-helix with approximately 50% beta pleated sheet form.
Figure 2:
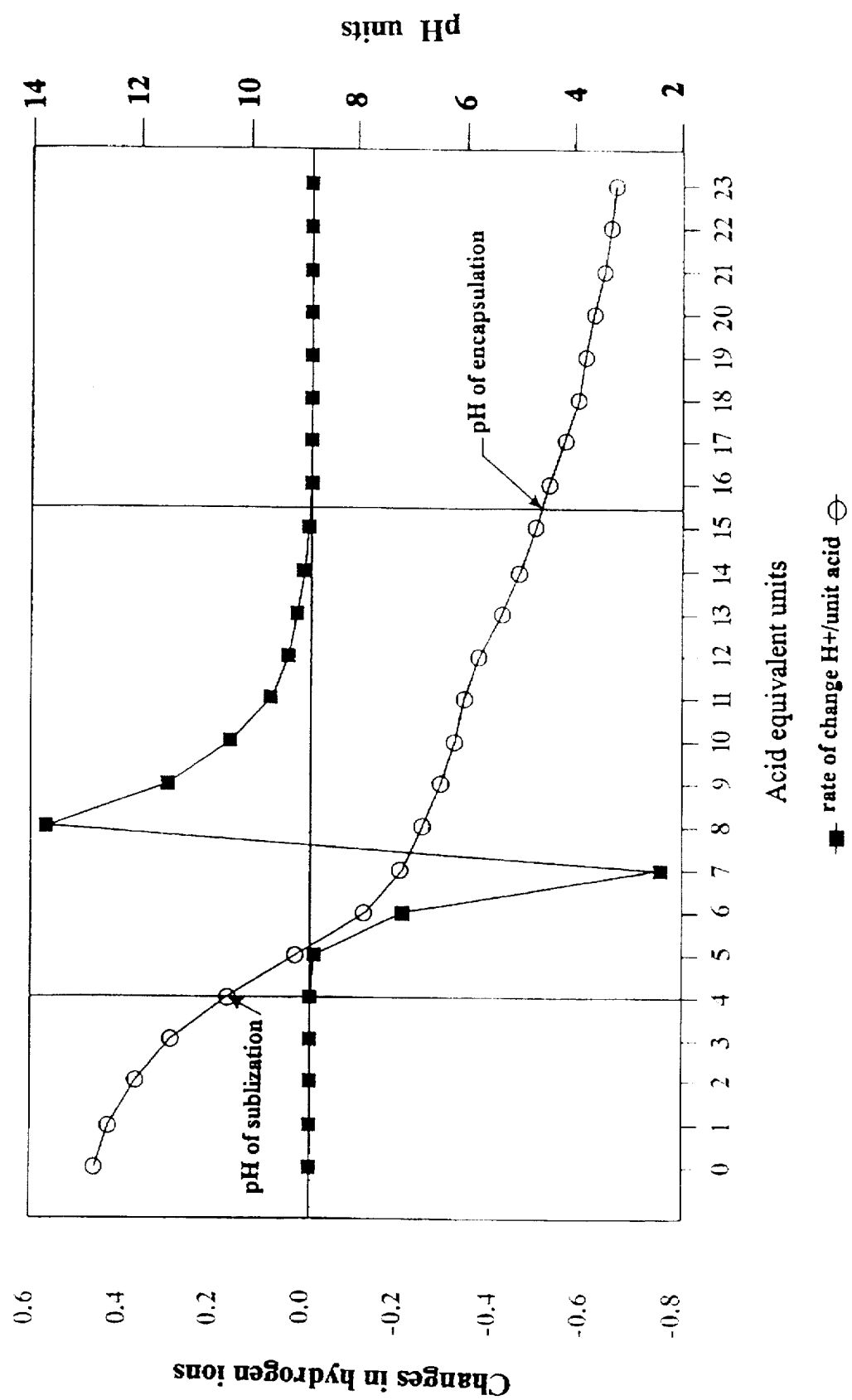
FIG. 2 is a graph is data for prophetic Example 1 plotted in the format of a compound graph.

In an exemplary embodiment of this invention encapsulated nutrient compositions, generally in the form of feeds and feed ingredients, derived from a proteinaceous mixture are produced by an the described process. The process is generally comprises the steps of:

treating the proteinaceous mixture by adding an alkali to cause the pH of the mixture to be raised to a basic pH range where proteins in the proteinaceous mixture will be solubilized to form a gel; maintaining the proteinaceous mixture at a temperature above the melting point of a lipid material, in a range between about 50° to 55° C.; adding if needed, sufficient lipid material, to the alkali-treated proteinaceous mixture to provide a dispersion with a ratio of lipid to proteinaceous mixture in a range from about 5 to 80, respectively; determining an optimum pH of solubilization wherein that optimum is expressed as an alkali hydrogen ion difference on a hydrogen ion difference curve, measuring rate of change of hydrogen ion difference per unit of acid equivalent, ceasing addition of alkali when the slope of the titration curve is essentially zero, adding an acid to the lipid material/proteinaceous mixture dispersion to cause the pH of the dispersion to be lowered to an acidic endpoint where the proteins in the dispersion will encapsulate the lipid material; the acidic endpoint being defined by i) determining a pH of encapsulation by titration wherein that pH of encapsulation is expressed as an acidic hydrogen ion difference on a hydrogen ion difference curve, ii) measuring rate of change of hydrogen ion difference per unit of acid equivalent, iii) ceasing addition of acid when the slope of the titration curve is essentially zero.

The process comprises treating the proteinaceous mixture with an alkali, for example, calcium hydroxide or other alkali; causing the pH to be raised to a range where the proteinaceous mixture is solubilized and will form a gel. The optimum pH of solubilization is determined by titration for the selected proteinaceous mixture. In general, these titrations are determined with samples of the target proteinaceous material and measured in the laboratory to determine the optimum pH of solubilization. The pH points are then used during commercial production. Optimum pH of solubilization is determined as an alkali hydrogen ion difference on a graph in which rate of change in hydrogen ion concentration varies with acid equivalent units.

Turning now to the protein source. The proteinaceous mixture can originate from any desired protein source for example: animal proteins, including but not limited to animal carcasses, animal blood, fish protein, poultry and poultry by-products and abattoir waste-stream proteins. With this process of encapsulating lipid with a protein, a uniform product with destruction of biological activity associated with the secondary and tertiary structure of proteins can be achieved without destroying the nutrient value and primary structure of the protein, formed by the peptide bonds; regardless of the protein source selected for the starting material.

The starting protein source is processed, if necessary, through any conventional chopping trash pump, such as the "Parma Chopper Pump" made by Parma Co. (Parma, Idaho). The chopping pump will break the undesirable solids up to the point where they can be pumped. Many starting protein sources will inherently contain undesirable solids, for example abattoir waste stream proteins are likely to contain ungular parts. During solubilization crude grinding can be utilized to reduce the size of the undesirable solids. In the case of starting protein sources such as blood or other protein sources in which the particle size of undesirable solids are initially small enough to pass through a pump, the chopping trash pump is not necessary.

The proteinaceous mixture is titrated with any appropriate alkali, here calcium hydroxide. Optimum pH of solubilization is determined from the rate of change in hydrogen ion concentration which occurs per uniform unit of base addition to water based proteinaceous mixture. The pH at each addition is measured upon reaching stabilization of pH meter reading. Rate of change of hydrogen ion difference is measured and when the slope of the titration curve is essentially zero, then addition of alkali is ceased.

Turning now to the solubilization, the solubilization is accomplished in the described embodiment by introducing the alkali source into a cone bottom tank in which the temperature is being controlled via a water jacket on the tank or other suitable means. The water jacket is designed with internal baffles to ensure uniform heating of the tank. The proteinaceous mixture is continuously recirculated through the tank. The proteinaceous mixture is maintained at a temperature above the melting point of the lipid to be used, optimum temperature is between about 50° and 55° C., and if it is desired or necessary to add lipid to have a lipid to protein ratio of 5 to 80, the lipid to be encapsulated is added. Better capsules are formed when lipids with low free fatty acid content are used. Following solubilization the protein/lipid blend is filtered, preferably using rotating screens, however any effective standard filtering method can be used. Examples of standard filtering methods that can be used include pumping past a conventional screening device such as vibrating screens, rotating screens, or cloth filters. With the exception of purified proteins and/or lipids, most protein/lipid streams will contain undesirable solid materials including but not limited to dirt, rocks, glass, metal, hair, bone, feathers, plant fiber, etc.

Filtering allows the removal of undesirable solid materials and difficult to solubilize protein sources, for example hair, feathers, horns, hoofs and the like. Additionally, filtering allows the removal of undesirable fibrous materials from plant sources of protein, allowing concentration of the protein. If the fibrous materials are not filtered out of the mixture prior to encapsulation the fibers will be included in the encapsulation and provide a source of physical and mechanical obstruction, preventing good encapsulation of the lipid by the solubilized proteinaceous mixture. To be effective the filtering must remove any materials which would not pass through the shearing and mixing device and would contaminate the final product.

Turning now to the encapsulation, the filtered and solubilized protein/lipid blend is pumped into the cone bottom tank surrounded by a hot water jacket. The cone of the tank is not jacketed to prevent excessive heating and possible charring of the tank contents. The bottom of the cone is designed in a manner to ensure a continuous supply of the thick-gelled product to the inlet side of the pump.

The proteinaceous mixture/lipid blend is pumped past a uniquely designed shearing and mixing device called a HydraShear, made by Parma Laboratories, Inc., Parma, Idaho which is described in U.S. Pat. No. 5,460,449. The filtered and solubilized protein/lipid blend is pumped into the cone bottom tank. The bottom of the cone bottom tank is designed in a manner to ensure a continuous supply of the thick gelled product to the inlet side of the pump.

The HydraShear causes formation of lipid droplets surrounded by protein. The design of the HydraShear allows formation of the protein/lipid emulsion without the entrainment of air, and in a manner such that protein/lipid droplet size is very small. The equipment also allows the addition of acids or other denaturants without the entrainment of air, before lipid droplets can reform into increasingly large droplets. Some heat is generated due to friction from pumping the material past the HydraShear. Other mixers which allow formation of protein/lipid emulsions without entrainment of air and in a manner such that protein/lipid droplet size is very small can also be used.

The pump must deliver the material to the HydraShear or other shearing device with a line pressure above 25 psi., preferably in the range of 90 to 180 psi. The discharge of the pump is plumbed to the HydraShear and immediately following the HydraShear an in-line injector is used to add acid, to adjust the pH to the pH of encapsulation or lower.

The next step in formation of a stable capsule is the addition of acid to lower the pH of the protein/lipid emulsion below the isoelectric point of the proteins. Acid must be added while the mixture is being processed by the HydraShear. Acid must be added in a smooth and controlled manner to ensure lipid droplets of small size and uniform encasing with protein as the pH is lowered. In the described embodiment the acid is injected into the center of the fluid stream immediately post-shearing, preferably in the center of the pipe that terminates with the mixing eductors. To accomplish the addition of the acid in a smooth manner in the described embodiment, the acid is added using a mixer with substantially propeller-shaped blades. Any device that produces gentle fluid turbulence at the point of addition will accomplish the smooth addition of the acid.

Turning now to the acid, phosphoric acid is used in the described embodiment, but any appropriate acid may be used, for example, phosphoric, hydrochloric, sulfuric, formic, acetic or propionic acid may be used.

To determine the correct ending pH, the proteinaceous mixture is titrated with the acid to be used and the optimum range is determined. Optimum pH of encapsulation is determined from the rate of change in hydrogen ion concentration which occurs per uniform unit of acid addition to water based proteinaceous mixture. The pH at each addition is measured upon reaching stabilization of pH meter reading. The best capsules will be created in a range at or below the pH of encapsulation, depending on use and storage time of the final product. Optimum pH of encapsulation is determined as an acid hydrogen ion difference on a graph in which rate of change in hydrogen ion concentration varies with acid equivalent units. The proteinaceous/lipid emulsion is titrated with acid. Rate of change of hydrogen ion difference is measured and when the slope of the titration curve is essentially zero, then addition of acid is ceased.

This pH range at or below the pH of encapsulation inhibits the growth of bacteria and other harmful micro-organisms and results in a dry encapsulated lipid that incorporates reduced quantities of exogenous chemicals and is safe for use as an animal feed, through improved capsule integrity and durability.

The selection of one or a mixture of the hydroxides of calcium, magnesium, sodium and potassium and/or the carbonates of sodium and potassium provide(s) the alkali and allow(s) control of the amount and ratios of the cations found in the finished product. The selection of one or a mixture of acids used to lower the pH allow(s) controls of the ratios and amounts of phosphate, chloride and sulfate, and ratios and amounts of anions from the strong acids (phosphoric, hydrochloric and sulfuric) and from the weak acids (formic, acetic and propionic) and the ratios and amounts of formic, acetic and propionic in the finished product.

By the proper selection of the alkali(s) and acid(s) used, the nutritional and electrolyte value of the finished product can be modified. Weak acids also provide additional antimicrobial protection. Fat soluble nutrients, such as vitamins, can be included during the encapsulation process. Fats susceptible to oxidation should ideally include an antioxidant, for example vitamin E or ethoxyquin before encapsulation.

Turning now to the encapsulated product, the plumbing returns the product to the tank and discharges it in the lower portion of the tank through mixing nozzles or preferably mixing eductors. The mixing eductors are arranged in a manner which maximizes mixing while preventing the entrainment of air. When the product is encapsulated it is diverted to a dryer or to intermediate storage before drying.

Any conventional drying means can be utilized to dry the encapsulated lipid. Examples of drying means used with the described embodiment of this invention include spray dryers and rotary-drum dryers.

Because the described process ensures complete exposure of proteins during denaturing, the certainty of the destruction of infectious vectors, namely prions, viruses, viral particles, and bacteria, greatly exceeds that of conventional rendering. Additionally, because the improved process of this invention does not require the addition of extraneous water to solubilize the protein, the encapsulated lipid can be dried more rapidly and much more economically than the products produced by other encapsulation processes. The improved process of this invention also allows the optimum pH for encapsulation to be attained with minimum exogenous chemical use. This results in a product with a better encapsulation that is also more commercially desirable because it is economical to produce.

The invention described herein has the unexpected advantage of producing conditions that will denature prions and produce complete inactivation of the infectious form of a prion. The process forms a stable complex where the secondary and tertiary structures of the proteins are disrupted. The combination of hydrophobic amino acid residues attracted to the lipid droplet and the denaturing of the protein with the hydrophilic residues orienting away from the lipid interior of the capsule provides a stable structure which prevents the prion protein from reverting to its half alpha helix and half beta pleated sheet secondary structure. Therefore, the infectivity of the spongiform encephalopathy pathogen is destroyed.

The following non-limiting prophetic examples are provided illustrate the invention in more detail.

EXAMPLE 1

This is a prophetic example in which an experiment is performed with brain tissue of healthy Syrian hamsters to determine the minimum pH of solubilization, i.e., the minimum alkali required and the maximum pH of encapsulation, and the minimum amount of acid required for encapsulation of the lipids found in the tissue. It is also determined that pH levels above minimum solubilization points can be used but will lead to increased alkali and acid usage and will partially or completely break down the primary structure of the protein. The pH levels below the maximum pH of encapsulation can be used to control viscosity and/or preservation.

The experimental procedure involves grinding between 10 and 50 grams of the protein material in a micro-blender. A standard solution of sodium hydroxide is used and delivered with a semi-automatic delivery device, uniform quantities of base are added during slow blending, and pH measures are recorded after stabilization of meter readings. The recorded pH measures are converted to hydrogen ion units, and the hydrogen ion difference is calculated for each successive alkali addition. The hydrogen ion difference per unit amount of added alkali for brain tissue is graphed. Using the graph of the hydrogen ion difference per unit amount of added alkali, the minimum pH of solubilization for brain tissue is determined to be at the point where the rate of change of hydrogen ion difference is essentially zero.

A portion of the proteinaceous material is taken to pH levels well above solubilization point to determine the full titration curve; that material is subsequently discarded. To the remaining portion of proteinaceous material a standard solution of phosphoric acid is delivered through a semi-automatic device, uniform quantities of acid are added during slow blending, and pH measures are recorded after stabilization of meter readings. The hydrogen ion difference per unit amount of added acid for brain tissue is graphed, the optimum pH of encapsulation is determined at the point where the rate of change of hydrogen ion difference is essentially zero. The rate of change in hydrogen ion concentration is determined by converting the pH to hydrogen ion concentration and determining the absolute difference in the concentration from the hydrogen ion concentration determined at the previous base or acid addition. The data in Example 1 is plotted in the format of a compound graph showing two lines, with one line being the change in hydrogen ion concentration of the mixture versus uniform units of acid or base addition and the second line being the pH of the mixture versus uniform units of acid or base addition.

EXAMPLE 2

This is a prophetic example which utilizes the results obtained from Example 1. The material produced in this Example 2 is used, as described, in Example 4. Thirty grams of brain tissue from healthy Syrian hamsters is heated in a hot water jacketed flask to a temperature of 55° C., and calcium hydroxide (approximately 0.5 gram) is added to solubilize the proteinaceous material until the pH reaches the minimum pH of solubilization determined in Example 1 (approximately pH of 10.7). The solubilized material is held at the above-referenced temperature and pH for 120 minutes ensuring complete solubilization.

The material is then pumped from the flask, through a small size HydraShear, immediately followed by an in-line acid injection port and returned to the flask in a manner ensuring uniform mixing of the flask contents. Phosphoric acid (approximately 0.8 gram) is added using a syringe connected to the in-line acid injection port to inject the acid into the material flow stream immediately after passing the HydraShear and before returning to the mixing flask. Over a period of 45 minutes, the temperature of the material is gradually raised and held at 70° C. for 15 minutes.

The material is then dried in glass dishes overnight at 100° C. The material is removed from the oven and allowed to cool, then ground into a fine powder. The material is fat free in appearance and to the touch, having a moisture content between 4 to 6 percent.

EXAMPLE 3

This is a prophetic example which utilizes the results obtained from Example 1. The material produced in this Example 3 is also used, as described, in Example 4. Thirty grams of brain tissue from scrapies infected Syrian hamsters is processed as described in Example 2.

EXAMPLE 4

This is a prophetic example in which scrapies inoculum is obtained from scrapies infected hamsters brains as described (Scott, et al., 1989, Cell). A control inoculum is made from uninfected hamsters brains. Healthy, scrapies free weanling Syrian hamsters are used as test subjects. Thirty subjects are intracerebrally inoculated (Prusiner, 1982, Ann Neuro) with control inoculum and serve as the negative control. Thirty subjects are intracerebrally inoculated with scrapies inoculum and serve as the positive control. Thirty subjects are intracerebrally inoculated with material from Example 2. Thirty subjects are intracerebrally inoculated with material from Example 3. All hamsters are monitored for development of clinical signs of scrapies as described by Marsh and Kimberlin 1975, J.Infect.Dis. Animals displaying symptoms of scrapies are sacrificed and preserved for further investigation. At the end of 200 days, all animals are sacrificed and tested to determine if there are any signs of scrapies infection.

The hamsters treated with the normal brain inoculum do not develop any clinical symptoms of scrapies. They do not have any spongiform degradation of the neuropil, do not have amyloid plaque accumulation confirmed using the assay method of DeArmond, et al., 1985, Cell, and do not carry protease resistant PrP proteins confirmed determining the protease sensitivity of the resident PrP proteins using the method of Kaneko, et al., 1995. The positive control hamsters treated with scrapies inoculum develop clinical symptoms of scrapies and exhibit spongiform degradation of the neuropil, have amyloid plaque accumulation, and carry protease resistant PrP proteins.

The animals injected the product produced from healthy, scrapies free hamsters in Example 2 express the same phenotype as the negative control hamsters. The animals injected the product produced from scrapies infected hamsters in Example 3 express the same phenotype as the negative control hamsters. The process described in Examples 1 and 2 destroys the infectivity of scrapies producing prions.

An advantage of this invention is that it provides a way to recover protein and fat for use in feeds and foods produced using animal proteins, that are occasionally contaminated by biologically active proteins which cause BSE, or by pathogenic bacteria such as Salmonella and *E.Coli*, or viruses such as Vesicular Exanthema (VE); wherein the process destroys all biological activity yet leaves the material digestible and nutrient value intact.

Another advantage of this process is that the resulting encapsulated lipid structure holds the proteins in a manner in which they cannot revert to their original secondary structure, ensuring the complete inactivation of all biological agents, including prions.

While there is shown and described the present exemplary embodiment of the invention, it will be understood that modifications and variations are possible without departing from the scope of the invention as expressed in the following claims.

What is claimed is:

1. A method for destroying infectious activity of infectious vectors in a proteinaceous mixture, wherein the infectious vectors are selected from the group consisting of prions, viruses and bacteria, the method comprising the steps of:
   a) treating the proteinaceous mixture by adding an alkali to cause the pH of the mixture to be raised to a basic pH range where proteins in the proteinaceous mixture will be solubilized to form a gel; maintaining the proteinaceous mixture at a temperature above the melting point of a lipid material, in a range between about 50° to 55° C.; and optionally adding sufficient lipid material, to the alkali-treated proteinaceous mixture to provide a dispersion with a ratio of lipid to proteinaceous mixture in a range from about 5 to 80, respectively;
   b) determining an optimum pH of solubilization wherein that optimum is expressed as an alkali hydrogen ion difference on a hydrogen ion difference curve,
   c) measuring rate of change of hydrogen ion difference per unit of acid equivalent,
   d) ceasing addition of alkali when the slope of the titration curve is essentially zero,
   e) adding an acid to the lipid material/proteinaceous mixture dispersion to cause the pH of the dispersion to be lowered to an acidic endpoint where the proteins in the dispersion will encapsulate the lipid material; the acidic endpoint being defined by i) determining a pH of encapsulation by titration wherein that pH of encapsulation is expressed as an acidic hydrogen ion difference on a hydrogen ion difference curve, ii) measuring rate of change of hydrogen ion difference per unit of acid equivalent, iii) ceasing addition of acid when the slope of the titration curve is essentially zero.

2. An animal feed product which is free of all infectious activity of proteins, viruses and bacteria wherein the animal feed product is produced by the process of claim 1.

3. A method for destroying infectious activity of Bovine Spongiform encephalopathy (BSE) containing proteins in feed products produced from a proteinaceous mixture contained in packing house waste, poultry, poultry by-products or livestock carcasses, comprising the steps of:

a) treating the proteinaceous mixture by adding an alkali to cause the pH of the mixture to be raised to a basic pH range where proteins in the proteinaceous mixture will be solubilized to form a gel; maintaining the proteinaceous mixture at a temperature above the melting point of a lipid material, in a range between about 50° to 55° C.; optionally adding sufficient lipid material, to the alkali-treated proteinaceous mixture to provide a dispersion with a ratio of lipid to proteinaceous mixture in a range from about 5 to 80, respectively;

b) determining an optimum pH of solubilization wherein that optimum is expressed as an alkali hydrogen ion difference on a hydrogen ion difference curve, c) measuring rate of change of hydrogen ion difference per unit of acid equivalent, d) ceasing, addition of alkali when the slope of the titration curve is essentially zero, e) adding an acid to the lipid material/proteinaceous mixture dispersion to cause pH of the dispersion to be lowered to an acidic endpoint where the proteins in the dispersion will encapsulate the lipid material; the acidic endpoint being defined by i) determining a pH of encapsulation by titration wherein that pH of encapsulation is expressed as an acidic hydrogen ion difference on a hydrogen ion difference curve, ii) measuring rate of change of hydrogen ion difference per unit of acid equivalent, iii) ceasing addition of acid when the slope of the titration curve is essentially zero.

4. A method for destroying infectious activity of BSE containing proteins in feed products produced from a proteinaceous mixture comprising the steps of:

a) treating the proteinaceous mixture by adding an alkali to cause the pH of the mixture to be raised to a basic pH range where proteins in the proteinaceous mixture will be solubilized to form a gel; maintaining the proteinaceous mixture at a temperature above the melting point of a lipid material, in a range between about 50° to 55° C.; optionally adding sufficient lipid material, to the alkali-treated proteinaceous mixture to provide a dispersion with a ratio of lipid to proteinaceous mixture in a range from about 5 to 80, respectively;

b) determining an optimum pH of solubilization wherein that optimum is expressed as an alkali hydrogen ion difference on a hydrogen ion difference curve, c) measuring rate of change of hydrogen ion difference per unit of acid equivalent, d) ceasing addition of alkali when the slope of the titration curve is essentially zero, e) adding an acid to the lipid material/proteinaceous mixture dispersion to cause the pH of the dispersion to be lowered to an acidic endpoint where the proteins in the dispersion will encapsulate the lipid material; the acidic endpoint being defined by i) determining a pH of encapsulation by titration wherein that pH of encapsulation is expressed as an acidic hydrogen ion difference on a hydrogen ion difference curve, ii) measuring rate of change of hydrogen ion difference per unit of acid equivalent, iii) ceasing addition of acid when the slope of the titration curve is essentially zero.

* * * * *